United States Patent
Miesterfeld et al.

(10) Patent No.: US 8,924,105 B1
(45) Date of Patent: Dec. 30, 2014

(54) METHODS AND SYSTEMS FOR REDUCING THE SPEED OF A VEHICLE

(71) Applicant: GM Global Technology Operations LLC, Detroit, MI (US)

(72) Inventors: Frederick P. Miesterfeld, Rochester Hills, MI (US); Orson S. Wang, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/954,332

(22) Filed: Jul. 30, 2013

(51) Int. Cl.
*B60W 10/06* (2006.01)
*B60W 10/18* (2012.01)
*B60T 8/17* (2006.01)
*F16H 61/18* (2006.01)

(52) U.S. Cl.
CPC .. *B60T 8/17* (2013.01); *F16H 61/18* (2013.01)
USPC ............................... 701/53; 477/115; 477/186

(58) Field of Classification Search
USPC ..................................... 701/53; 477/115, 186
See application file for complete search history.

(56) References Cited

U.S. PATENT DOCUMENTS

| | | | |
|---|---|---|---|
| 4,907,681 A * | 3/1990 | Kuusik et al. | 192/219.5 |
| 6,878,096 B1 * | 4/2005 | Winner et al. | 477/94 |
| 2011/0015038 A1 * | 1/2011 | Lovell et al. | 477/186 |
| 2012/0136543 A1 * | 5/2012 | Jang et al. | 701/53 |

* cited by examiner

*Primary Examiner* — Edwin A Young
(74) *Attorney, Agent, or Firm* — Quinn Law Group, PLLC

(57) ABSTRACT

A controller can execute a method to reduce a speed of a vehicle by initiating a vehicle stop request in response to a vehicle signal received while the vehicle is in motion. The method includes: (a) applying a wheel brake in response to initiation of the vehicle stop request when the vehicle is moving at a vehicle speed less than or equal to a first vehicle speed threshold in order to reduce the vehicle speed; and (b) actuating a parking sprag assembly to stop rotation of an output member of a transmission when the vehicle speed is equal to or less than a second vehicle speed threshold. By example, the vehicle signal may be a park signal, an engine off signal, or a plurality of signals defining a condition set. The wheel brake may be at least one of an electronic park brake and a service brake.

19 Claims, 2 Drawing Sheets

METHODS AND SYSTEMS FOR REDUCING THE SPEED OF A VEHICLE

TECHNICAL FIELD

The present disclosure relates to methods and systems for reducing the speed of a vehicle when a park vehicle stop request is initiated while the vehicle is in motion.

BACKGROUND

Automatic transmissions can operate in several transmission operating modes such as park, drive, reverse, and neutral. Motion of the vehicle may be ceased by engaging the transmission in park mode, typically by engaging a park sprag or other form of transmission brake to cease rotational output from the transmission to the vehicle wheels. Engaging the park sprag or transmission brake above a threshold speed may result in vehicle oscillation during the stopping sequence and stress on the powertrain components including the park sprag.

SUMMARY

By reducing the speed of a vehicle in motion below a threshold level in response to a vehicle stop request and prior to engaging the park sprag, oscillation of the vehicle during the stopping sequence and stress on the powertrain components including the park sprag during the stopping sequence can be reduced or minimized. The methods and systems described in the present disclosure can be used for reducing the speed of a vehicle when vehicle stop request is initiated while the vehicle is in motion, to activate a wheel brake in order to reduce the vehicle speed before shifting the transmission to the park mode.

The presently disclosed methods can be used in connection with a vehicle that includes wheels, a wheel brake, a controller, and a transmission having an output member and a parking sprag assembly coupled to the output member. As used herein, the term "wheel brake" refers to brakes capable of stopping the rotation of the wheels. As used herein, the term "parking sprag" refers to a mechanism capable of stopping rotation of the output member and/or capable of engaging the transmission in park mode. The parking sprag may be alternatively referred to as a parking pawl.

A vehicle controller can execute a method to reduce the speed of the vehicle when a vehicle stop request is initiated while the vehicle is in motion at or below a first speed threshold. In one example, a vehicle stop request can be initiated by the controller when the shift selector is actuated to input a park signal while the vehicle is in motion. In another example, the vehicle stop request can be initiated by the controller when an engine off input is initiated while the vehicle is in motion. In another example, the vehicle stop request can be initiated by the controller when a condition set is satisfied, for example, when a door open condition and a driver present condition are contemporaneously detected by the controller while the vehicle is in motion. The method includes applying a wheel brake in response to the vehicle stop request when the vehicle is moving at a speed that is less than or equal to a first vehicle speed threshold, to reduce the vehicle speed. The method continues with monitoring the vehicle speed after application of the wheel brake. The method further includes actuating a parking sprag assembly to stop rotation of an output member of a transmission when the vehicle speed decreases such that the vehicle speed is equal to or less than a second vehicle speed threshold. The method may further include actuating the parking sprag assembly to stop rotation of the output member of the transmission when a rate of decrease in vehicle speed after application of the wheel brake is below a threshold rate.

In an embodiment, the method includes monitoring, via the controller, a vehicle speed and initiating a vehicle stop request using the controller. As used herein, the term "vehicle stop request" refers to the controller receiving one or more vehicle inputs and/or vehicle signals from one or more vehicle systems, vehicle components, and/or vehicle sensors that indicates a condition set has been met requesting the controller to initiate stopping the vehicle while the vehicle is in motion. In one example, a vehicle stop request may include receiving a park signal initiated by an operator by selecting the park input of the vehicle shift selector, which may be an electronic, mechanical, or electromechanical shift selector, to signal the controller to shift the vehicle into park, while the vehicle is in motion. As used herein, the term "park signal" refers to a signal from the vehicle shift selector that indicates that an operator has actuated the shift selector to select the park input.

The method further includes determining if the vehicle speed is less than or equal to a first vehicle speed threshold; applying the wheel brake in response to the vehicle stop request if the vehicle speed is less than or equal to the first vehicle speed threshold in order to reduce the vehicle speed; and determining if the vehicle speed is less than or equal to a second vehicle speed threshold after the wheel brake is applied. Moreover, the method includes actuating the parking sprag assembly to stop rotation of the output member of the transmission when the vehicle speed is less than or equal to the second vehicle speed threshold. In this method, the second vehicle speed threshold is less than the first vehicle speed threshold.

Applying the wheel brake may include applying an electronic park brake. As a non-limiting example, the first vehicle speed threshold may range between 3 and 5 miles per hour. As a non-limiting example, the second vehicle speed threshold may range between 0.1 and 1.0 miles per hour. The vehicle may further include a vehicle speed sensor coupled to the wheel. Monitoring the vehicle speed may be performed based on a vehicle speed signal received from the vehicle speed sensor. The controller includes a vehicle control module disposed in electronic communication with the vehicle speed sensor, which may be configured to include a powertrain control module (PCM) or an electronic brake control module (EBCM). The EBCM may also perform the functions of an Anti-Lock Brake System (ABS), a Traction Control System (TCS), and an Electronic Stability Control (ESC). The EBCM is in electronic communication with the wheel brake. The vehicle stop request may be received by the controller, which via the EBCM can command the wheel brake to be applied upon receipt of the vehicle stop request and detection of a vehicle speed equal to or less than the first speed threshold. Monitoring the vehicle speed includes monitoring the vehicle speed before, during and after application of the wheel brake. Actuation of the parking sprag assembly is performed after the wheel brake has been applied and the speed of the vehicle is at or below a second speed threshold, or when the rate of decrease of vehicle speed is below a rate threshold.

The present disclosure also relates to vehicles such as passenger cars, sports utility vehicles, and trucks. In an embodiment, the vehicle includes an engine and a transmission coupled to the engine. The engine may be any type of engine or motor configured as a power source to couple to a transmission to provide torque at the input member of the transmission to propel a vehicle. For example, the engine may be an internal combustion engine, a rotary engine, an electronic motor, a generator, etc. The transmission includes a parking sprag assembly and an output member. The parking sprag assembly is configured to stop the rotation of the output member of the transmission. The vehicle further includes a plurality of wheels coupled to the output member and a plurality of electronic park brakes coupled to the wheels. Moreover, the vehicle includes a shift selector configured to generate a park signal when a park input is selected. Further, the vehicle includes a controller in communication with the electronic shift selector and the electronic park brakes. The controller is configured to perform the following functions: (a) monitor a vehicle speed; (b) receive a park request; (c) determine if the vehicle speed is less than or equal to a first vehicle speed threshold; (d) command the electronic park brakes to be applied in response to the park request if the vehicle speed is less than or equal to the first vehicle speed threshold in order to reduce the vehicle speed; (e) determine if the vehicle speed is less than or equal to a second vehicle speed threshold after the electronic park brakes are applied; and (f) command the parking sprag assembly to be actuated in order to stop rotation of the output member of the transmission when the vehicle speed is less than or equal to the second vehicle speed threshold. The first vehicle speed threshold is greater than the second vehicle speed threshold. As a non-limiting example, the first vehicle speed threshold may range between 3 and 5 miles per hour. As a non-limiting example, the second vehicle speed threshold may range between 0.1 and 1.0 miles per hour.

The vehicle further includes a vehicle speed sensor coupled to at least one of the wheels. The controller is configured to monitor the vehicle speed based on a vehicle speed signal received from the vehicle speed sensor. The controller may include a PCM or EBCM disposed in electronic communication with the vehicle speed sensor. The controller is configured to initiate the vehicle stop request in response to one or more vehicle inputs or vehicle condition sets. In addition, the controller in electronic communication with the wheel brakes can command the wheel brakes to be applied upon initiation of the vehicle stop request. The controller is configured to monitor the vehicle speed even after the wheel brakes have been applied. Further, the controller is configured to command the parking sprag assembly to be actuated after the wheel brakes have been applied and either the vehicle speed has decreased to a second speed threshold, or the rate of decrease of the vehicle speed with the wheel brakes applied is below a rate threshold.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
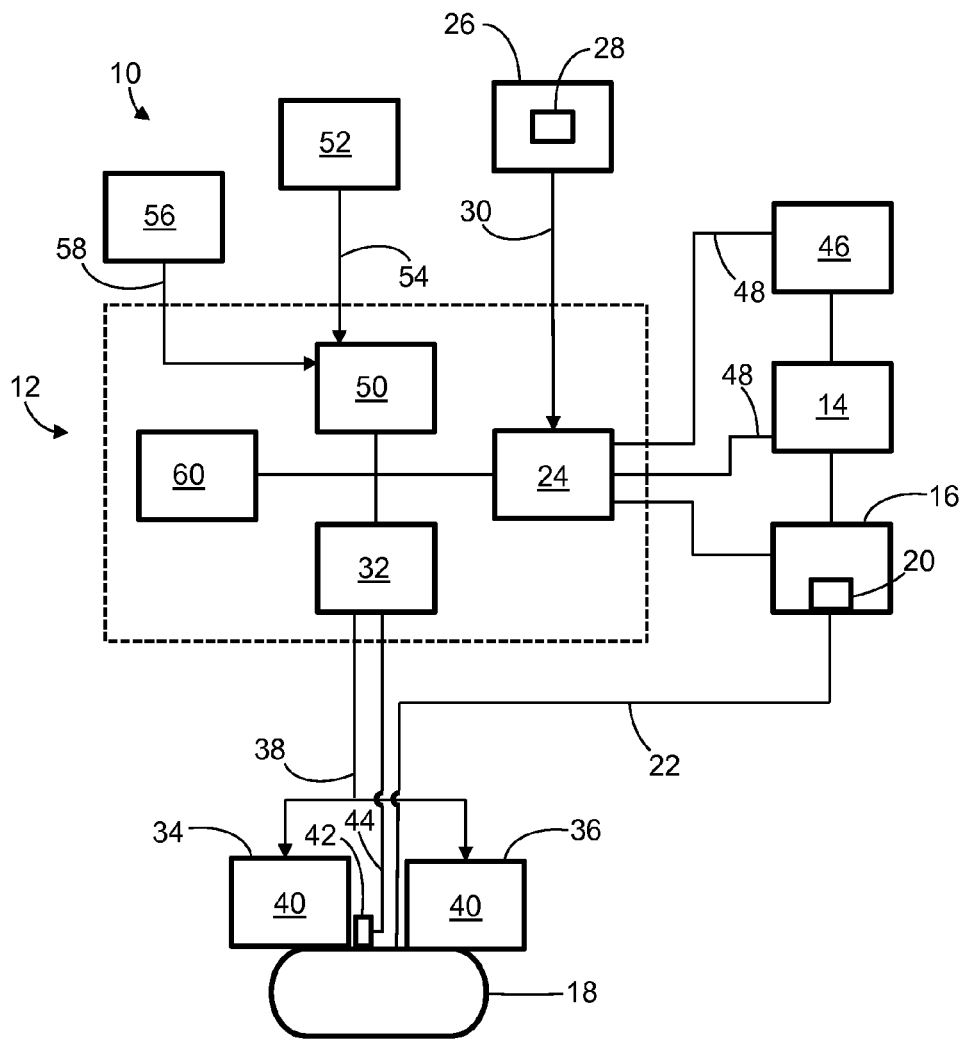
FIG. 1 is a block diagram of a vehicle in accordance with an embodiment of the present disclosure.

Referring to the drawings, FIG. 1 schematically illustrates a vehicle 10 that includes a vehicle controller 12, an engine 14, a transmission 16, and one or more wheels 18 coupled to the transmission 16. The engine 14 may be any type of engine or motor configured as a power source to couple to the transmission 16 to provide torque at the input member (not shown) of the transmission 16 to propel the vehicle 10. For example, the engine 14 may be an internal combustion engine, a rotary engine, an electronic motor, a generator, etc. Alternatively, the engine 14 may be any other kind of engine capable of propelling the vehicle 10.

The transmission 16 interconnects the engine 14 and the wheels 18 and can therefore transmit torque from the engine 14 to the wheels 18. Specifically, the transmission 16 includes an output member 22 coupled to the wheels 18. The output member 22 may be an output shaft and can transmit torque to the wheels 18 when the transmission 16 receives torque from the engine 14. In the depicted embodiment, the transmission 16 additionally includes a parking sprag assembly 20 (or any other suitable transmission brake) configured to stop rotation of the output member 22. The sprag assembly 20 may include a parking sprag (not shown) configured to engage a parking gear of the transmission 16. The parking sprag may be alternatively referred to as a parking pawl. The parking sprag assembly 20 can move between a disengaged position and an engaged position. In the disengaged position, the parking sprag assembly 20 does not lock the output member 22 and, therefore, the output member 22 can move to transmit torque to the wheels 18. In the engaged position, the parking sprag assembly 20 locks the output member 22 and consequently stops the rotation of the output member 22. Thus, the output member 22 cannot transmit torque to the wheels 18 when the parking sprag assembly 20 is in the engaged position. When the parking sprag assembly 20 is in the engaged position, the transmission 16 is considered to be in its park mode. As discussed above, the parking sprag assembly 20 may alternatively be any kind of transmission brake capable of stopping the movement of the output member 22. Accordingly, the reference number 20 in the drawings may identify any kind of transmission brake.

The vehicle 10 includes a vehicle control system 12, which may be referred to herein as a vehicle controller 12. The vehicle controller 12 may include one or more control modules, such as one or more of a powertrain control module (PCM) 24, an electronic brake control module (EBCM) 32, a body control module (BCM) 50, and a chassis control module (CCM) 60. Each of the respective control modules 24, 32, 50 and 60 may be in communication with each of the other control modules included in the controller 12. The EBCM may also perform the functions of an Anti-Lock Brake System (ABS), a Traction Control System (TCS), and an Electronic Stability Control (ESC). The EBCM 32, BCM 50, CCM 60, and the PCM 24 may be collectively referred to as the vehicle controller 12. The controller 12 is configured to monitor a vehicle speed and to initiate a vehicle stop request. As used herein, the term "vehicle stop request" refers to the controller 12 initiating a controlled stopping of the vehicle 10 in response to receiving one or more inputs and/or signals from one or more vehicle systems, components, and/or sensors that indicates a condition set has been met requesting the controller 12 to stop the vehicle 10 while the vehicle 10 is in motion. The controller 12 may be configured such that one of the EBCM 32, CCM 60, and PCM 24 may initiate the vehicle stop request. In one embodiment, the CCM 60 is configured to initiate the vehicle stop request and to communicate with the EBCM 32 and the PCM 24 to provide a controlled stopping of the vehicle 10 according to a method described herein. The CCM 60 may be configured to receive one or more inputs and/or signals, from one or more vehicle systems, components, and/or sensors directly or via one or more control modules such as control modules 32, 24, 50, that indicate a condition set has been met requesting the CCM 60 to initiate a vehicle stop request. However, the vehicle 10 does not necessarily include the CCM 60.

As used herein, the terms "controller" and "control module" refers to one or more microprocessor-based devices having one or more processors, tangible, non-transitory memory including but not necessarily limited to read only memory (ROM), random access memory (RAM), electrically-erasable programmable read-only memory (EEPROM), flash memory, etc., and circuitry including but not limited to a high-speed clock, analog-to-digital (A/D) circuitry, digital-to-analog (D/A) circuitry, a digital signal processor or DSP, transceivers, and the necessary input/output (I/O) devices and other signal conditioning and/or buffer circuitry. As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term "module" may include memory (shared, dedicated, or group) that stores code executed by the processor. The term "code," as used above, may include software, firmware, and/or microcode, and may refer to programs, routines, functions, classes, and/or objects. The term "shared," as used above, means that some or all code from multiple modules may be executed using a single (shared) processor. In addition, some or all code from multiple modules may be stored by a single (shared) memory. The term "group," as used above, means that some or all code from a single module may be executed using a group of processors. In addition, some or all code from a single module may be stored using a group of memories.

The PCM 24 may be in communication with the transmission 16 and the engine 14, and may perform the functions of a transmission control module (TCM) and an engine control module (ECM). Alternatively, the PCM 24 includes a TCM and an ECM in electronic communication with one another. Thus, the PCM 24 may control the operation of the engine 14, the transmission 16, or both. In any case, the PCM 24 can receive inputs from various devices and sensors to monitor different vehicle performance parameters. In the depicted embodiment, the PCM 24 can receive inputs from the engine 14 and/or a vehicle ignition system 46, which inputs may include an engine off signal 48. Upon receipt of the engine off signal 48 by the PCM 24, the PCM 24 may command the engine 14 to shut off, and such that receipt of the engine off signal 48 by the controller 12 may cause the controller 12 to initiate a vehicle stop request. In one embodiment, the CCM 60 may receive the engine off signal 48 via the PCM 24, and may initiate the vehicle stop request. The PCM 24 may also be configured to be in communication with a vehicle speed sensor 42 or the EBCM 32, such that the PCM 24 may monitor the vehicle speed. The vehicle 10 additionally includes a shift selector 26 in electronic communication with the PCM 24. Alternatively, the vehicle 10 includes a shifter control module (not shown) in electronic communication with the shifter selector 26 and the PCM 24. The shift selector 26 may be an electronic, mechanical, or electromechanical shift selector. In one example, the shift selector 26 may include a shifter lever (not shown), and a driver may select the transmission operating mode by moving a shifter lever to a mode input. For example, the driver may select the transmission park mode by moving the shifter lever to a lever position corresponding to a park input 28. As used herein, the term "park input" refers to a user interface defined by the shift selector 26, which may be any kind of user interface capable of being activated by an operator to cause the shift selector 26 to send the park input 28 to the controller 12. In another example, the shift selector 26 may be configured as an electronic shift selector including an electronic interface (not shown), such as a touch pad or button array, instead of a shift lever, where the electronic interface may include a touch screen display, buttons and/or switches as inputs corresponding to different transmission operating modes. For instance, an electronic shift selector may include a park button, a reverse button, a drive button, and a neutral button. To select a transmission operating mode in a vehicle with an electronic shift selector, the driver can push the input button that corresponds to the desired transmission operating mode. For instance, the driver can push the button of the electronic shift selector to select the park mode of the automatic transmission.

An operator may actuate the button, switch, or touch pad location corresponding to the park input 28 to select the park mode of the transmission 16. Actuating the park input 28 causes the shift selector 26 to send a park signal 30 to the PCM 24 and as such to the controller 12. Upon receipt of the park signal 30 from the shift selector 26, the powertrain module 24 commands the transmission 16 to shift to its park mode. As discussed in detail below, however, this shift to the park mode may be selectively delayed while the controller 12 initiates a vehicle stop request to apply a wheel brake 40 below a first speed threshold S1 to decrease the vehicle speed to a second speed threshold S2 prior to applying the park sprag assembly 20 to shift the transmission 16 to the park mode.

The EBCM 32 is in electronic communication with the shift selector 26 and the PCM 24. The controller 12 can indicate the EBCM 32 when it has initiated the vehicle stop request. The vehicle 10 may include a vehicle speed sensor 42 configured to measure the vehicle speed by, for example, measuring the speed of the wheel rotation. The vehicle speed sensor 42 is therefore coupled to at least one wheel 18 and is in electronic communication with the EBCM 32 and as such with the controller 12. The vehicle speed sensor 42 can send a vehicle speed signal 44 indicative of vehicle speed to the EBCM 32 for communication to the controller 12. The EBCM 32 and the controller 12 can thus monitor the vehicle speed based on the vehicle speed signal 44 received from the vehicle speed sensor 42.

The vehicle 10 includes one or more electronic park brakes 34 coupled to at least one of the wheels 18. The electronic park brake 34 is configured to reduce the speed of the wheels 18 when applied and is in electronic communication with the EBCM 32. Moreover, the electronic park brakes 34 are coupled to at least one of the wheels 18. The EBCM 32 can send a park brake signal 38 to the electronic park brake 34. Upon receipt of the park brake signal 38, the electronic park brakes 34 are applied in order to reduce the speed of the wheels 18, thereby reducing the vehicle speed.

The vehicle 10 also includes one or more service brakes 36 in communication with the EBCM 32. The service brakes 36 may be foundation brakes and are coupled to at least one of the wheels 18. When applied, the service brakes 36 can reduce the speed of the wheels 18, thereby reducing the vehicle speed. In addition, the service brakes 36 can receive the park brake signal 38 from the EBCM 32. Specifically, the EBCM 32 may send the park brake signal 38 to the electronic park brake 34, the service brakes 36, or both. Upon receipt of the park brake signal 38, the service brakes 36 are applied to reduce the speed of the wheels 18. The service brakes 36 and the electronic park brake 34 may both be referred to as wheel brakes 40. As used herein, the term "wheel brake" refers to a brake capable of stopping the rotation of a wheel. The wheel brakes 40 are therefore coupled to the wheels 18 and are configured to reduce the speed of the wheels 18 when applied.

During operation of the vehicle 10, the operator may select or otherwise actuate the park input 28 in order to generate a park signal to command the transmission 16 to shift to its park mode while the vehicle 10 is moving. As discussed above, the parking sprag assembly 20 is actuated when the transmission 16 shifts to the park mode. Actuating the parking sprag assembly 20 while the vehicle 10 is moving may stress the drivetrain of the vehicle 10. It is therefore desirable to reduce the stress in the vehicle drivetrain when the driver actuates the park input 28 of the shift selector 26 while the vehicle 10 is in motion, by initiating a vehicle stop request to delay the engagement of the park sprag assembly 20 to the output 22 until wheel brakes 40 may be applied to slow the vehicle below a second threshold speed S2.

The vehicle 10 includes a door open sensor 52 and at least one driver present sensor 56 which are both in communication with the BCM 50 and as such in communication with the controller 12. The door open sensor 52 is configured to output a door open signal 54 to the BCM 50 when a door open condition is detected. The driver present sensor 56 is configured to output a driver present signal 58 to the BCM 50 when the presence of a driver in the vehicle is detected or indicated. In one embodiment, the driver present sensor 56 may be a seat sensor configured to detect the presence of a driver in the driver's seat (not shown) of the vehicle 10 and to output a driver present signal 58 when a driver presence is detected. In another embodiment, the driver present sensor 56 may be configured to detect foot pressure on, or movement of, at least one of the brake pedal and accelerator to indicate the presence of a driver. The examples provided are not intended to be limiting, and other configurations of driver present sensors 56 may be used. The combination of a door open signal 54, a vehicle speed signal 44 indicating the vehicle is in motion, and a driver present signal 58 may, when received contemporaneously by the controller 12, define a condition set causing the controller 12 to initiate a vehicle stop request.

As described previously, the controller 12 initiates the vehicle stop request in response to vehicle inputs such as a park signal 30 or an engine off signal 48, or in response to a plurality of vehicle inputs defining a vehicle stop condition set, such as the condition set including a door open signal 54 and a driver present signal 58 in combination with a vehicle speed signal 44 indicating the vehicle 10 is in motion. The controller 12 continues to monitor the vehicle speed signal 44 during initiation of the vehicle stop request, and commands, via the EBCM 32, the wheel brakes 40 to be applied upon initiation of the vehicle stop request and detection of a vehicle speed signal 44 corresponding to a vehicle speed equal to or below a first speed threshold S1. The controller 12 continues to monitor the vehicle speed signal 44 after the wheel brakes 40 have been applied, to determine the rate of change (decrease) in vehicle speed as the result of application of the wheel brakes 40. Further, the controller 12 is configured to command the parking sprag assembly 20 to be actuated after the wheel brakes 40 have been applied and either the vehicle speed has decreased to a second speed threshold S2, or the rate of decrease of the vehicle speed with the wheel brakes 40 applied is below a rate threshold. The operation of the parking sprag assembly 20 may be controlled by the PCM 24, a TCM (not shown), a parking sprag control module (not shown), or any other suitable control module or controller.

Figure 2:
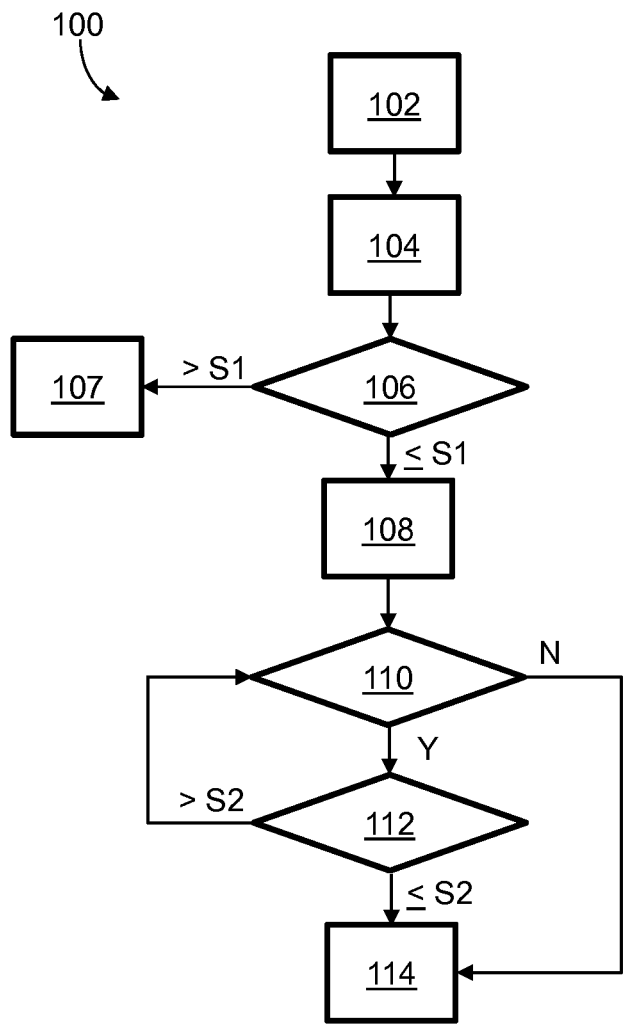
FIG. 2 is a flowchart of a method for reducing the speed of the vehicle of FIG. 1 when a vehicle stop request is received by a vehicle controller while the vehicle is in motion.

FIG. 2 illustrates a flowchart of a method 100 for reducing the speed of the vehicle 10 when the park input 28 of the shift selector 26 is actuated while the vehicle 10 is in motion. The method 100 begins at step 102. Step 102 entails monitoring the vehicle speed. The controller 12, for example, via the EBCM 32, may monitor the vehicle speed based on the vehicle speed signal 44 received from the vehicle speed sensor 42. The method 100 then continues to step 104.

Step 104 entails the controller 12 initiating a vehicle stop request in response to an input received by the controller 12. The input may be, for example, a park signal 30, an engine off signal 48, or a combination of signals defining a condition set such that the controller 12 is actuated to initiate the vehicle stop request. In one example, the condition set may include a combination of a door open signal 54, a driver present signal 58 and a speed signal 44 indicating the vehicle 10 is in motion. Next, the method 100 continues to step 106. In one embodiment, the vehicle stop request is initiated by the controller 12 via the CCM 60 in communication with at least the PCM 24 and EBCM 32.

Step 106 includes determining if the vehicle speed is less than or equal to a first vehicle speed threshold S1. At step 106, the controller 12 may compare the monitored vehicle speed (in step 102) to the first vehicle speed threshold S1. As a non-limiting example, the first vehicle speed threshold S1 may range between 3 and 5 miles per hour (mph). For instance, the first vehicle speed threshold S1 may be about 3 mph. If the monitored vehicle speed is not less than or equal to the first vehicle speed threshold S1, the method 100 continues to step 107. At step 107, the electronic park brake 34 is not applied. Also at step 107, the parking sprag assembly 20 is not actuated. If the monitored vehicle speed is less than or equal to the first vehicle speed threshold S1, the method 100 continues to step 108. Although not specifically shown in the flowchart of FIG. 2, step 106 may also include determining if the monitored vehicle speed is less than or equal to a second vehicle speed threshold S2. As discussed in detail below, the second vehicle speed threshold is less than the first vehicle speed threshold S1. If the monitored vehicle speed vehicle speed is less than or equal to the second vehicle speed threshold S2, then the electronic park brake 34 is not applied and the parking sprag assembly 20 is immediately applied.

At step 108, at least one of the electronic park brakes 34 or the service brakes 36 are continuously applied to reduce the vehicle speed. In other words, if the monitored vehicle speed is less than or equal to the first vehicle speed threshold S1, any of the wheel brakes 40 are continuously applied to reduce the vehicle speed. To apply the wheel brakes 40, the EBCM 32 sends the park brake signal 38 to the electronic park brake 34, the service brakes 36, or both. Upon receipt of the park brake signal 38, the electronic park brakes 34, the service brakes 36, or both, are continuously applied to reduce the vehicle speed.

At step 110, following application of the wheel brakes 40, the controller 12 continues monitoring the vehicle speed. Step 110 entails determining if the vehicle speed, after the wheel brakes 40 have been applied, is decreasing at a rate equal to or greater than a threshold rate. If the vehicle speed is decreasing at a rate greater than or equal to a threshold rate, then the method 100 continues to step 112. If the vehicle speed is decreasing at a rate less than the threshold rate, then the method 100 continues to step 114, which entails actuating the parking sprag assembly 20 to reduce or completely stop the rotation of the output member 22 of the transmission 16.

Step 112 entails determining if the vehicle speed, after the wheel brakes 40 have been applied, is less than or equal to a second vehicle speed threshold S2. At step 112, the controller 12 may compare the monitored vehicle speed to the second vehicle speed threshold S2. As a non-limiting example, the second vehicle speed threshold S2 may range between 0.1 mph and 1.0 mph. For instance, the second vehicle speed threshold S2 may be about 0.1 mph. In any case, the second vehicle speed threshold S2 is less than the first vehicle speed threshold S1. If the monitored vehicle speed, after the wheel brakes 40 have been applied, is not less than or equal to the second vehicle speed threshold S2, the method 100 returns to step 110, wherein the controller 12 continues to monitor the rate of change of the vehicle speed with the wheel brakes 40 being continuously applied to the wheels 18. If the monitored vehicle speed, after the wheel brakes 40 are applied, is less than or equal to the second vehicle speed threshold S2, the method 100 proceeds to step 114.

Step 114 entails actuating the parking sprag assembly 20 (or any suitable transmission brake) to reduce or completely stop the rotation of the output member 22 of the transmission 16. To do so, the controller 12 via the PCM 24 commands the parking sprag assembly 20 to move to its engaged position. At this point, the transmission 16 is in its park mode. By using the method 100, the vehicle 10 can be stopped in a controlled manner when a vehicle stop request is received by the controller 12 while the vehicle 10 is in motion.

The examples and embodiments described herein are not intended to be limiting. For example, the configuration of the controller 12 including the EBCM 32, BCM 50, CCM 60, and the PCM 24 shown in FIG. 1 is not intended to be limiting, and it would be understood that each of these control modules 24, 32, 50, 60 in communication with each other and/or other control modules (not shown) comprise a distributed vehicle control system such that one or more of the control modules 24, 32, 50, 60 may be configured to perform the functions of another respective control module and/or the functions within the controller 12. In another example, it would be understood that combinations of vehicle signals other than those described herein may define a condition set causing the controller 12 to initiate a vehicle stop request where it may be desirable to actuate a decrease in vehicle speed from the first speed threshold S1 to the second speed threshold S2 using the wheel brakes 40 prior to applying the parking sprag assembly 20 to the output 22, to provide a controlled stopping sequence and minimize stress on the transmission 16 during shifting of the transmission 16 into park mode.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method for reducing a speed of a vehicle in motion, the vehicle including wheels, a wheel brake, a controller, and a transmission having an output member and a parking sprag assembly coupled to the output member, the method comprising:
monitoring, via the controller, a vehicle speed;
initiating a vehicle stop request in response to a vehicle signal received by the controller;
determining if the vehicle speed is less than or equal to a first vehicle speed threshold;
applying the wheel brake in response to the vehicle stop request if the vehicle speed is less than or equal to the first vehicle speed threshold in order to reduce the vehicle speed;
determining if the vehicle speed is less than or equal to a second vehicle speed threshold after the wheel brake is applied;
actuating the parking sprag assembly to stop rotation of the output member of the transmission when the vehicle speed is less than or equal to the second vehicle speed threshold; and
wherein the second vehicle speed threshold is less than the first vehicle speed threshold.

2. The method of claim 1, wherein applying the wheel brake includes applying an electronic park brake.

3. The method of claim 1, wherein the first vehicle speed threshold ranges between 3 and 5 miles per hour.

4. The method of claim 1, wherein the second vehicle speed threshold ranges between 0.1 and 1.0 miles per hour.

5. The method of claim 1, wherein:
the vehicle further includes a shift selector; and
the vehicle signal is a park signal received from the shift selector.

6. The method of claim 1, wherein:
the vehicle further includes one of an ignition and an engine; and
the vehicle signal is an engine off signal received from the one of the ignition and the engine.

7. The method of claim 1, wherein:
the vehicle signal includes a plurality of signals received contemporaneously by the controller; and
the plurality of signals includes a door open signal, a driver present signal, and a vehicle speed signal corresponding to the vehicle in motion.

8. The method of claim 1, wherein applying the wheel brake includes applying a service brake.

9. The method of claim 1, wherein monitoring the vehicle speed includes monitoring the vehicle speed before, during, and after the wheel brake has been applied.

10. The method of claim 1, wherein actuating the parking sprag assembly is performed after the wheel brake has been applied.

11. The method of claim 1, further comprising:
monitoring a rate of decrease of the vehicle speed after the wheel brake has been applied; and
actuating the parking sprag assembly to stop rotation of the output member of the transmission when the rate of decrease of the vehicle speed is less than a rate threshold.

12. A vehicle, comprising:
a transmission including a parking sprag assembly and an output member, the parking sprag assembly being configured to stop rotation of the output member;
a plurality of wheels coupled to the output member;
a plurality of wheel brakes coupled to the wheels;
a controller in communication with the wheel brakes, the controller being configured to:
monitor a vehicle speed;
receive a vehicle signal;
initiate a vehicle stop request in response to the vehicle signal;
determine if the vehicle speed is less than or equal to a first vehicle speed threshold;
command the wheel brakes to be applied in response to the vehicle stop request if the vehicle speed is less than or equal to the first vehicle speed threshold in order to reduce the vehicle speed;
determine if the vehicle speed is less than or equal to a second vehicle speed threshold after the wheel brakes are applied; and
command the parking sprag assembly to be actuated in order to stop rotation of the output member of the transmission when the vehicle speed is less than or equal to the second vehicle speed threshold.

13. The vehicle of claim 12, wherein:
the controller is configured to determine a rate of decrease of the vehicle speed after the wheel brakes are applied; and command the parking sprag assembly to be actuated in order to stop rotation of the output member of the transmission when the rate of decrease of the vehicle speed is less than a threshold rate.

14. The vehicle of claim 12, wherein the first vehicle speed threshold ranges between 3 and 5 miles per hour.

15. The vehicle of claim 14, wherein the second vehicle speed threshold ranges between 0.1 and 1.0 miles per hour.

16. The vehicle of claim 12, further comprising a shift selector in communication with the controller;
wherein the vehicle signal is a park signal generated by the shift selector.

17. The vehicle of claim 12, further comprising one of an ignition and an engine in communication with the controller;
wherein the vehicle signal is one of an engine off signal generated by the one of the ignition and the engine.

18. The vehicle of claim 12, further comprising:
a door open sensor configured to output a door open signal to the controller;
a driver present sensor configured to output a driver present signal to the controller; and
wherein the vehicle signal is defined by a condition set including contemporaneous receipt by the controller of the door open signal, the driver present signal, and a vehicle speed signal corresponding to the vehicle in motion.

19. A method for reducing a speed of a vehicle when a park input of an electronic shift selector is actuated while the vehicle is in motion, the method comprising:
applying a wheel brake in response to an actuation of the park input when the vehicle is moving at a vehicle speed that is less than or equal to a first vehicle speed threshold in order to reduce the vehicle speed; and
actuating a parking sprag assembly to stop rotation of an output member of a transmission when the vehicle speed is equal to or less than a second vehicle speed threshold;
wherein the first vehicle speed threshold is greater than the second vehicle speed threshold.

* * * * *